United States Patent
Roos et al.

(10) Patent No.: US 6,629,407 B2
(45) Date of Patent: Oct. 7, 2003

(54) LEAN BURN EMISSIONS SYSTEM PROTECTANT COMPOSITION AND METHOD

(75) Inventors: Joseph W. Roos, Mechanicsville, VA (US); Martin J. Openshaw, Kingsclere (GB); Herbert M. Scull, Mechanicsville, VA (US)

(73) Assignee: Ethyl Corporation, Richmond, VA (US)

( * ) Notice: Subject to any disclaimer, the term of this patent is extended or adjusted under 35 U.S.C. 154(b) by 0 days.

(21) Appl. No.: 09/734,946

(22) Filed: Dec. 12, 2000

(65) Prior Publication Data

US 2002/0112466 A1 Aug. 22, 2002

(51) Int. Cl.[7] ............................................. F01N 3/00
(52) U.S. Cl. ..................... 60/274; 60/297; 60/299; 60/301; 60/303; 44/358; 44/359; 44/361; 44/366; 123/1 A
(58) Field of Search ......................... 60/274, 286, 299, 60/301, 303, 295, 297; 44/358, 359, 361, 363, 366; 123/1 A (56) References Cited

U.S. PATENT DOCUMENTS

| | | |
|---|---|---|
| 2,086,775 A | 7/1937 | Lyons et al. |
| 2,151,432 A | 3/1939 | Lyons et al. |
| 4,036,605 A | 7/1977 | Hartle |
| 4,104,036 A | 8/1978 | Chao et al. |
| 4,139,349 A | 2/1979 | Payne |

(List continued on next page.)

FOREIGN PATENT DOCUMENTS

| | | |
|---|---|---|
| EP | 0 466 512 B1 | 6/1994 |
| EP | 0 668 899 B1 | 9/2000 |

OTHER PUBLICATIONS

Bailie, J.D.; Michalski, G.W.; Unzelman, G.H., MMT—A Versatile Antiknock; Natl. Pet. Refiners Assoc., [Tech. Pap.], AM–78–36, pp. 1–20.

Lenane, D.L.; Effect of MMT on Emission from Production Cars; SAE [Tech. Pap.] 78003, pp. 1–20.

Faix, Louis J.; A Study of the Effects of Manganese Fuel Additive on Automotive Emissions; SAE [Tech. Pap], 780002, pp. 1–12.

Lenane, D.L.; Effect of a Fuel Additive On Emission Control Systems; SAE [Tech. Pap.] 902097, pp. 1–17.

Farrauto, Robert J.; Mooney, John J.; Effects of Sulfur on Performance of Catalytic Aftertreatment Devices; SAE [Tech. Pap.] 920557, pp. 1–7.

Aradi, Allen A.; Roos, Joseph W.; Fort, Jr., Ben F.; Lee, Thomas E.; and Davidson, Robert I.; The Physical and Chemical Effect of Manganese Oxides on Automobile Catalytic Converters, SAE [Tech. Pap.] 940747, pp. 207–218.

Fekete, Nicholas; Gruden, Dirk Voigtlander; Nester, Ulrich; Krutzsch, Bernd; Willand, Jurgen; and Khuh, Michael; Advanced Engine Control and Exhaust Gas Aftertreatment of a Leanburn SI Engine; SAE [Tech. Pap.] 972873; pp. 1–10.

(List continued on next page.)

Primary Examiner—Thomas Denion
Assistant Examiner—Binh Tran
(74) Attorney, Agent, or Firm—Dennis H. Rainear; Leah O. Robinson (57) ABSTRACT

A method, apparatus, and fuel composition for the protection of a catalytic after treatment system and a method for protecting a catalytic after treatment system in a lean burn system are disclosed. A scavenging agent is introduced into the combustion chamber in an amount effective to complex with catalytic poisoning combustion byproducts and improve emissions system durability. In a preferred embodiment, the scavenger is an organometallic compound which also imparts additional desirable properties to the fuel.

22 Claims, 4 Drawing Sheets

U.S. PATENT DOCUMENTS

| | | |
|---|---|---|
| 4,474,580 A | 10/1984 | MacKenzie et al. |
| 4,568,357 A | 2/1986 | Simon |
| 4,588,416 A | 5/1986 | Zaweski et al. |
| 4,674,447 A | 6/1987 | Davis |
| 4,804,388 A | 2/1989 | Kukin |
| 4,891,050 A | 1/1990 | Bowers et al. |
| 4,908,045 A | 3/1990 | Farrar |
| 4,946,609 A | 8/1990 | Pruess et al. |
| 4,955,331 A | 9/1990 | Hohr et al. |
| 5,113,803 A | 5/1992 | Hollrah et al. |
| 5,376,154 A | 12/1994 | Daly et al. |
| 5,584,894 A | 12/1996 | Peter-Hoblyn et al. |
| 5,599,357 A | 2/1997 | Leeper |
| 5,732,548 A * | 3/1998 | Peter-Hoblyn ............... 60/274 |
| 5,758,496 A * | 6/1998 | Rao et al. ..................... 60/295 |
| 5,809,774 A * | 9/1998 | Peter-Hoblyn et al. ....... 60/274 |
| 5,813,224 A * | 9/1998 | Rao et al. ..................... 60/274 |
| 5,919,276 A | 7/1999 | Jeffrey |
| 5,928,392 A | 7/1999 | Aradi |
| 5,944,858 A | 8/1999 | Wallace |
| 5,953,906 A * | 9/1999 | Gamel et al. ................ 60/274 |
| 6,003,303 A * | 12/1999 | Peter-Hoblyn et al. ....... 60/274 |
| 6,051,040 A | 4/2000 | Peter-Hoblyn |
| 6,056,792 A | 5/2000 | Barr et al. |
| 6,193,767 B1 * | 2/2001 | Arters et al. .................. 44/412 |
| 6,200,358 B1 | 3/2001 | Fleischer et al. |

OTHER PUBLICATIONS

Arakawa, Kenji; Matsuda, Satoshi; and Kinoshita, Hiroo; Progress in Sulfur Poisoning Resistance of Lean NOx Catalysts; SAE [Tech. Pap.] 980930, pp. 111–118.

Dearth, Mark A., Hepburn, Jeffrey S.; Thansaiu, Eva; McKenzie, Joanne; Horne, G. Scott; Sulfur Interaction with Lean NOx Traps: Laboratory and Engine Dynamometer Studies; SAE [Tech. Pap.] 982595.

Guyon, M.; Blejean, F.; Bert, C.; and Le Faou, Ph.; Impact of Sulfur on Nox Trap Catalyst Activity—Study of the Regeneration Conditions; SAE [Tech. Pap.] 982607, pp. 87–95.

* cited by examiner

LEAN BURN EMISSIONS SYSTEM PROTECTANT COMPOSITION AND METHOD

BACKGROUND OF THE INVENTION

1. Field of the Invention

The present invention relates, generally, to a method and apparatus which protects lean burn catalytic-based emissions control systems. Lean burn emissions systems as used herein broadly includes catalysts and associated equipment which is generally located in the effluent stream of a lean burn combustion system, e.g. in the exhaust or the like. Lean burn combustion systems are combustion systems that operate under lean conditions by design for some portion of the operating time. Examples of lean burn combustion systems include diesel engines, heterogeneously charged direct injection gasoline engines, and other systems that operate under lean conditions for a significant amount of operating time. The exhaust treatment system for these applications operate to reduce exhausts emissions under lean conditions and may well operate under other conditions. The invention contemplates the addition of various compounds to a fuel, for example a low sulfur fuel, or lubricant to protect the emissions systems from poisoning by exhaust byproducts, as well as methods of improving the performance of emissions hardware by protecting emissions systems from poisoning from impurities found in fuel and lubricant sources and increasing the catalyst durability in these systems.

More specifically, the present invention relates to fuel or lubricant compositions containing an organometallic compound which acts as a scavenger to reduce the impact of poisons such as sulfur, phosphorus or lead on catalytic emissions control systems (e.g., a catalyst or trap) used for reducing tailpipe emissions, thereby contributing to lowered emissions characteristics and improved emissions system efficiency and improved emission hardware (e.g., catalyst) durability.

2. Description of the Prior Art

It is well known in the automobile industry to reduce tailpipe emissions by using various strategies. The most common method for reducing emissions from spark ignition engines is by careful control of the air-fuel ratio and ignition timing. For example, retarding ignition timing from the best efficiency setting reduces HC and $NO_x$ emissions, while excessive retard of ignition increases the output of CO and HC. Increasing engine speed reduces HC emissions, but $NO_x$ emissions increase with load. Increasing coolant temperature tends to reduce HC emissions, but this results in an increase in $NO_x$ emissions.

It is also known that treating the effluent stream from a combustion process by exhaust after treatment can lower emissions. The effluent contains a wide variety of chemical species and compounds, some of which may be converted by a catalyst into other compounds or species. For example, it is known to provide exhaust after treatment using a three-way catalyst and a lean $NO_x$ trap. Other catalytic and non-catalytic methods are also known.

Thermal reactors are noncatalytic devices which rely on homogeneous bulk gas reactions to oxidize CO and HC. However, in thermal reactors, $NO_x$ is largely unaffected. Reactions are enhanced by increasing exhaust temperature (e.g. by a reduced compression ratio or retarded timing) or by increasing exhaust combustibles (rich mixtures). Typically, temperatures of 1500° F. (800° C.) or more are required for peak efficiency. Usually, the engine is run rich to give 1 percent CO and air is injected into the exhaust. Thermal reactors are seldom used, as the required setting dramatically reduces fuel efficiency.

Catalytic systems are capable of reducing $NO_x$ as well as oxidizing CO and HC. However, a reducing environment for $NO_x$ treatment is required which necessitates a richer than chemically correct engine air-fuel ratio. A two-bed converter may be used in which air is injected into the second stage to oxidize CO and HC. While efficient, this procedure results in lower fuel economy.

Single stage, three way catalysts (TWC's) are widely used, but they require extremely precise fuel control to be effective. Only in the close proximity of the stoichiometric ratio is the efficiency high for all three pollutants, excursions to either side of stoichiometric can cause increases in hydrocarbon and carbon monoxide or NOx emissions. Such TWC systems can employ, for example, either a zirconia or titanium oxide exhaust oxygen sensor or other type of exhaust sensor and a feedback electronic controls system to maintain the required air-fuel ratio near stoichiometric.

Catalyst support beds may be pellet or honeycomb (e.g. monolithic). Suitable reducing materials include ruthenium and rhodium, while oxidizing materials include cerium, platinum and palladium.

Diesel systems raise a different set of challenges for emissions control. Strategies for reducing particulate and HC include optimizing fuel injection and air motion, effective fuel atomization at varying loads, control of timing of fuel injection, minimization of parasitic losses in combustion chambers, low sac volume or valve cover orifice nozzles for direct injection, reducing lubrication oil contributions, and rapid engine warm-up.

In terms of after treatment, it is known that diesel engines generally burn lean and the exhaust will therefore usually contain excess oxygen. Thus, $NO_x$ reduction with conventional three-way catalysts is not feasible. $NO_x$ is removed from diesel exhaust by either selective catalytic reduction, the use of lean NOx catalysts such as those comprised of zeolitic catalysts or using metals such as iridium, or catalyzed thermal decomposition of NO into $O_2$ and $N_2$.

Diesel particulate traps have been developed which employ ceramic or metal filters. Thermal and catalytic regeneration can burn out the material stored. Particulate standards of 0.2 g/mile may necessitate such traps. Both fuel sulfur and aromatic content contribute to particulate emissions. Catalysts have been developed for diesels that are very effective in oxidizing the organic portion of the particulate.

Improved fuel economy can be obtained by using a lean-burn gasoline engine, for example, a direct injection gasoline engine, however currently $NO_x$ cannot be reduced effectively from oxidizing exhaust using a typical three-way catalyst because the high levels of oxygen suppress the necessary reducing reactions. Without a $NO_x$ adsorber or lean $NO_x$ trap (LNT), the superior fuel economy of the lean-burn gasoline engine cannot be exploited. The function of the LNT is to scavenge the $NO_x$ from the exhaust, retaining it for reduction at some later time. Periodically, the LNT must be regenerated by reducing the $NO_x$. This can be accomplished by operating the engine under rich air-fuel ratios for the purpose of purging the trap. This change in operating conditions can adversely effect fuel economy as well as driveability. These LNT's may also be placed on diesel engines, which also operate in a lean air-fuel mode. As in the lean-burn gasoline engines, the exhaust of both types of engines is net oxidizing and therefore is not conducive to the reducing reactions necessary to remove $NO_x$. It is an object of the present invention to improve the storage efficiency and durability of the LNT and to prolong the useful life of the LNT before regeneration is necessary.

It is well known that $NO_x$ adsorbers are highly vulnerable to deactivation by sulfur (see, for example, M. Guyon et al., *Impact of Sulfur on $NO_x$ Trap Catalyst Activity-Study of the Regeneration Conditions*, SAE Paper No. 982607 (1998); and P. Eastwood, *Critical Topics in Exhaust Gas Aftertreatment*, Research Studies Press Ltd. (2000) pp.215–218.) and other products resulting from fuel combustion and normal lubricant consumption. It is an object of the present invention to provide fuel or lubricant compositions capable of reducing the adverse impact of sulfur, and other exhaust byproducts, on the emissions system including $NO_x$ adsorbers and LNTs.

Performance fuels for varied applications and engine requirements are known for controlling combustion chamber and intake valve deposits, cleaning port fuel injectors and carburetors, protecting against wear and oxidation, improving lubricity and emissions performance, and ensuring storage stability and cold weather flow. Fuel detergents, dispersants, corrosion inhibitors, stabilizers, oxidation preventers, and performance additives are known to increase desirable properties of fuels.

Organometallic manganese compounds, for example methylcyclopentadienyl manganese tricarbonyl (MMT), available from Ethyl Corporation of Richmond, Va., is known for use in gasoline as an antiknock agent (see, e.g. U.S. Pat. No. 2,818,417). These manganese compounds have been used to lower deposit formation in fuel induction systems (U.S. Pat. Nos. 5,551,957 and 5,679,116), sparkplugs (U.S. Pat. No. 4,674,447) and in exhaust systems (U.S. Pat. Nos. 4,175,927, 4,266,946, 4,317,657, and 4,390,345). Organometallic iron compounds, such as ferrocene, are known as well for octane enhancement (U.S. Pat. No. 4,139,349).

Organometallics for example compounds of Ce, Pt, Mn or Fe among others have been added to fuel to enhance the ability of particulate traps to regenerate or to directly reduce the emissions of particulate from diesel or compression ignition type engines or other combustion systems. These additives function through the action of the metal particles that are the product of additive breakdown on the particulate matter during combustion or in the exhaust or particulate trap.

SUMMARY OF THE INVENTION

The present invention contemplates supplying, in a spark- or compression ignition lean combustion system a sufficient amount of an organometallic compound to effectively reduce the impact of poisoning substances on catalytic-based emissions control systems for fuel-combustion systems.

The combustion of a fuel containing an organometallic manganese compound, such as MMT, results in mixtures of manganese compounds containing, among others, species of manganese oxides, manganese phosphates and manganese sulfates. As used hereinafter, a stoichiometric ratio will be referred to using lambda, which is calculated using the following formula:

$$\text{lambda} = \frac{\text{air/fuel ratio}}{\text{stoichiometric air/fuel ratio}}.$$

When lambda=1, the system is stoichiometric. When lambda>1 the system is a lean system. When lambda<1, the system is a rich system. The lean burn combustion systems of the present invention are combustion systems that operate lean by design for a majority of the operating time. Lean combustion systems of the present invention are those systems operating at a lambda of >1.2, preferably >1.4 and more preferably >1.5.

In a gasoline or diesel engine that is operating with excess air according to the present invention, under lean conditions, and using a fuel containing an organometallic compound according to the present invention, the metal will combine with, e.g., sulfur to form, e.g., metal sulfates in the exhaust. These compounds are not stable at the high temperatures typically found in the exhaust manifold or those associated around typical three way catalysts. However, at lower temperatures under which lean $NO_x$ catalysts, catalytic diesel particulate traps, continuously regenerating traps, lean $NO_x$ traps or diesel oxidation catalysts operate or other treatment systems operate, the metal can scavenge the sulfur and form stable metal sulfates. This scavenging process then ties up the sulfur and protects the catalyst from sulfur deposition. Suitable exhaust temperatures in the vicinity of the LNT are those temperatures that enable the formation of some stable sulfates with the metal from the organometallic scavenger. Typical exhaust temperatures are below 650° C., preferably below 600° C. and more preferably below about 500° C. For example, from about 200 to about 650° C.

Suprisingly, when a compound according to the present invention is used in a fuel containing sulfur, especially low amounts of sulfur, the conversion efficiency of emissions control systems is maintained at a much higher rate than when the base fuel is used alone.

DETAILED DESCRIPTION

A lean $NO_x$ system, as used herein, means one which is a non-stoichiometrically balanced, oxygen-rich system. Traditionally, oxygen rich systems include diesel systems and the like. Many efforts have been made to provide catalysts for such a system.

However, such emission systems have a tendency to lose their effectiveness over time. The present invention contemplates providing an organometallic compound to a fuel or lubricant composition. Suitable organometallic compounds include those containing at least one alkali, alkaline earth or transition metal in conjunction with an appropriate ligand.

Preferred metals include sodium, potassium, calcium, barium, strontium, rhodium, cerium, palladium, platinum, iron, manganese and mixtures thereof The addition of a variety of organometallic compounds to fuel compositions is known. Representative organometallic compounds for use in the present invention include those compounds taught in U.S. Pat. Nos. 4,036,605; 4,104,036; 4,474,580; 4,568,357; 4,588,416; 4,674,447; 4,891,050; 4,908,045; 4,946,609; 4,955,331; 5,113,803; 5,599,357; 5,919,276; 5,944,858; 6,051,040 and 6,056,792; and European Patent EP 466 512 B1.

Especially preferred organometallic compounds are those containing at least one of the metals selected from the group consisting of manganese, iron, strontium, cerium, barium, platinum and palladium. Preferred manganese containing organometallic compound are manganese tricarbonyl compounds delivered in the fuel or through the lubricating composition. Such compounds are taught, for example, in U.S. Pat. Nos. 4,568,357; 4,674,447; 5,113,803; 5,599,357; 5,944,858 and European Patent No. 466 512 B1. Other methods of delivery, including direct injection of the organometallic compound into the combustion chamber or exhaust, are also suitable for practice of the instant invention.

Suitable manganese tricarbonyl compounds which can be used in the practice of this invention include cyclopentadienyl manganese tricarbonyl, methylcyclopentadienyl manganese tricarbonyl, dimethylcyclopentadienyl manganese tricarbonyl, trimethylcyclopentadienyl manganese tricarbonyl, tetramethylcyclopentadienyl manganese tricarbonyl, pentamethylcyclopentadienyl manganese tricarbonyl, ethylcyclopentadienyl manganese tricarbonyl, diethylcyclopentadienyl manganese tricarbonyl, propylcyclopentadienyl manganese tricarbonyl, isopropylcyclopentadienyl manganese tricarbonyl, tert-butylcyclopentadienyl manganese tricarbonyl, octylcyclopentadienyl manganese tricarbonyl, dodecylcyclopentadienyl manganese tricarbonyl, ethylmethylcyclopentadienyl manganese tricarbonyl, indenyl manganese tricarbonyl, and the like, including mixtures of two or more such compounds. Preferred are the cyclopentadienyl manganese tricarbonyls which are liquid at room temperature such as methylcyclopentadienylmanganesetricarbonyl, ethylcyclopentadienyl manganese tricarbonyl, liquid mixtures of cyclopentadienyl manganese tricarbonyl and methylcyclopentadienyl manganese tricarbonyl, mixtures of methylcyclopentadienyl manganese tricarbonyl and ethylcyclopentadienyl manganese tricarbonyl, etc.

Preparation of such compounds is described in the literature, for example, U.S. Pat. No. 2,818,417, the disclosure of which is incorporated herein in its entirety.

When formulating fuel compositions of this invention, the organometallic compounds (e.g., cyclopentadienyl manganese tricarbonyl compounds) are employed in amounts sufficient to reduce the impact of poisons, e.g., sulfur, lead and phosphorus, on the emissions control systems of a lean operation fuel fired engine. Thus the fuels will contain minor amounts of the organometallic compounds sufficient to control the impact of such deposits within lean $NO_x$ traps and other low-temperature or lean catalyst systems. Generally speaking, the fuels of the invention will contain an amount of the organometallic compound sufficient to provide from about 0.5 to about 120 mg of metal per liter of fuel, and preferably from about 1 to about 66 mg of manganese per liter and more preferably from about 2 to about 33 mg of metal per liter of fuel. When added to the lubrication systems of automobiles as a means of delivering the metal to the fuel combustion system, the organometallic concentration may be increased to provide the above amounts of the metal in the combustion chamber.

While not wishing to be bound by the following theory, it is postulated that the sulfur in the fuel reacts with the metal, for example the manganese in MMT, to form metal sulfates ($MSO_4$) which are stable in the temperature range of 200–650° C. Surprisingly, metal sulfates such as $MnSO_4$ do not bind to active sites on the catalyst whereas free sulfur does often in the form of a sulfate.

When the emissions system contains a component (e.g., a barium-containing lean $NO_x$ trap) which is poisonable by combustion byproducts such as sulfur, applicants novel compositions and methods provide a substance which competes with the active site (e.g., barium) in the lean-burning engine-out exhaust. So long as the metal of the scavenging agent will compete with the metal of the catalyst system for complexing with the potential emissions system poisons (e.g., sulfur) the metals may be suitable for use as scavenging agents in the practice of the present invention. The ability of the metal scavenging agent to compete with the metals of the catalyst for complexing with the catalyst poisons can be determined by monitoring catalyst durability. Further, the organometallic scavengers of the present invention can reduce the detrimental impact of other poisons, such as phosphorus or lead, on emissions control systems of the lean burn combustion systems of the present invention.

It is especially preferred that the sulfur content of the fuel be less than 100 ppm, and the treatment rate of the organometallic compound be up to 120 mg/l, more preferably up to 66 mg/l, and most preferably up to 33 mg/l, based upon the amount of metal delivered to the fuel composition. Higher rates are possible, but excessive treatment of the fuel stock may be detrimental to proper functioning of the combustion system componentry.

In a combustion engine, normal operation results in the combustion of the lubricant and additives such as those containing phosphorus or zinc added to the lubricant. While it has been known that some compounds can prevent deposition of phosphorous and zinc on exhaust aftertreatment devices under essentially stoichiometric conditions found on spark ignition engines equipped with carburetors or fuel injection, suprisingly, the compositions of the present invention interact with the combustion products of these additives under lean engine operating conditions and reduce their adverse impact on exhaust aftertreatment devices. The novel compositions prevent the compounds, such as phosphorus, from covering catalyst or storage sites in the aftertreatment systems and reducing the aftertreatment system's effectiveness. With the compositions of the present invention, the aftertreatment system's effectiveness in maintained over extended periods of operation.

EXAMPLES

Example 1

Figure 1:
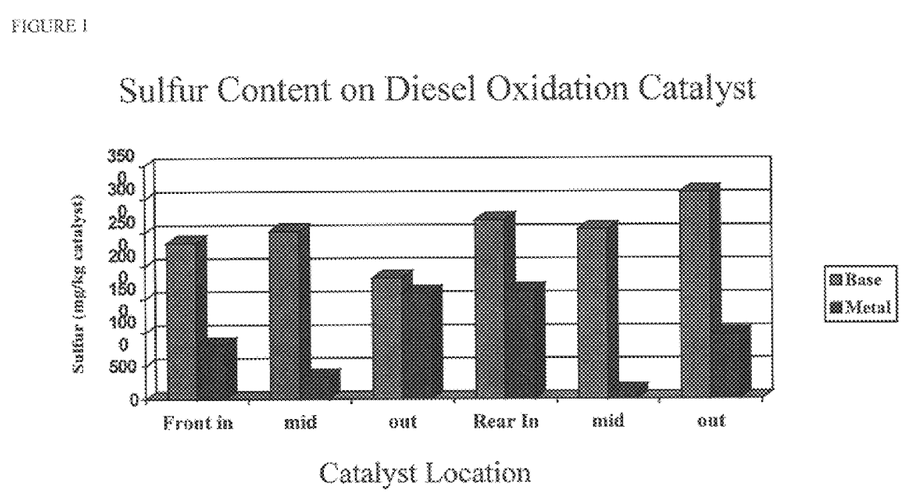
FIG. 1 is a graphical representation comparing the sulfur content on a diesel oxidation catalyst aged 80,000 km on base diesel fuel (Base) or additized diesel fuel containing organometallic compounds (Metal).

Two vehicles equipped with diesel engines and oxidation catalysts were tested over 80,000 km. One vehicle used diesel fuel. The other used diesel fuel containing organometallic additives in an amount sufficient to provide 17 ppm calcium and 3 ppm manganese to the fuel. At the end of mileage accumulation the two catalysts were removed from the vehicle and the elemental content of these catalysts was evaluated. As seen in FIG. 1, the catalysts from the vehicle operated on a fuel containing organometallic scavengers contained lower amounts of sulfur. This demonstrates that use of organometallic compounds scavenges sulfur and prevents it deposition on the catalyst.

Example 2

These same diesel catalysts were examined for other catalyst poisons as shown in Table 1 below. The catalyst from the engine operated according to the present invention was found to contain lower amounts of phosphorus and lead compared to the catalysts from the vehicle using base fuel. This scavenging of P and Pb has not been observed in engines that run significantly greater air than stoichiometric or in diesel engine applications. The presence of P and Pb on a catalyst would reduce catalyst activity; therefore, the scavenging of these compounds by the additive should provide greater catalyst durability.

TABLE I

CATALYST POISON CONTENT (ppm)

| Catalysts | Base Fuel | | | Fuel + organometallic scavengers | | |
|---|---|---|---|---|---|---|
| | Pb | P | S | Pb | P | S |
| Front in | 22 | 4756 | 2344 | 19.6 | 1565 | 812 |
| mid | 24 | 4375 | 2518 | 12.8 | 1294 | 331 |
| out | 20.9 | 4303 | 1812 | 16.6 | 1046 | 1586 |
| Rear in | 26 | 4246 | 2683 | 16.1 | 1379 | 1623 |
| mid | 25 | 2094 | 2543 | 17.8 | 944 | 1111 |
| out | 23.8 | 1361 | 3098 | 17.8 | 794 | 965 |
| Average | 23.62 | 3522.5 | 2499.7 | 16.78 | 1170.3 | 1071.33 |

As may be seen from the above examples, the addition of the organometallic compound acts to reduce the deposits of P, Pb and S upon the catalyst structure, thereby enhancing life and maintaining efficiency of the emissions system and reducing overall emissions.

Such a reduction of deposits on catalysts is unexpected, as heretofore, such catalysts and additive systems have been suitable only for so-called stoichiometrically balanced systems, and it is unexpected that an unbalanced system, e.g. a lean fuel combustion system, would work.

Further, the method according to the instant invention is especially useful in low sulfur fuels, e.g., those with 100 ppm or less, more preferably less than 50 ppm, most preferably less than 30 ppm, sulfur, as it enhances the sulfur emissions reduction without the need to resort to more expensive desulfurization procedures.

An especially preferred sulfur range in the fuel according to the present invention is from about 20 to about 50 ppm sulfur. The deleterious effects of other catalyst poisons, including those such as phosphorus and lead, are also suitable for reduction according to the present invention by providing competing scavengers according to the present invention. Thus the advantage of the present invention can still be recognized with ultra-low sulfur fuels as well as sulfur-free fuels.

The base fuels suitable for use in the operation of spark-ignition or compression-ignition internal combustion engines or burners of the present invention include diesel fuel, jet fuel, kerosene, synthetic fuels, such as Fischer-Tropsch fuels, liquid petroleum gas, fuels derived from coal, natural gas, propane, butane, unleaded motor and aviation gasolines, and so-called reformulated gasolines which typically contain both hydrocarbons of the gasoline boiling range and fuel-soluble oxygenated blending agents, such as alcohols, ethers and other suitable oxygen-containing organic compounds. Oxygenates suitable for use in the present invention include methanol, ethanol, isopropanol, t-butanol, mixed $C_1$ to $C_5$ alcohols, methyl tertiary butyl ether, tertiary amyl methyl ether, ethyl tertiary butyl ether and mixed ethers. Oxygenates, when used, will normally be present in the base fuel in an amount below about 25% by volume, and preferably in an amount that provides an oxygen content in the overall fuel in the range of about 0.5 to about 5 percent by volume.

In a preferred embodiment, the middle-distillate fuel is a diesel fuel having a sulfur content of up to about 0.01% by weight, more preferably up to about 0.005% by weight, most preferably up to about 0.003% by weight, as determined by the test method specified in ASTM D 2622-98.

Example 3

A commercial lean NOx trap from a direct injection gasoline (DIG) engine was cored and cut into 1 inch by ¾ inch diameter samples. A catalyst sample was placed in a 1 inch stainless tube which in turn was in an electric oven down stream of a pulsed flame combustor. The pulsed flame combustor burned iso-octane with and without MMT. The combustor cycle was 5 min. consisting of 4 min. lean operation to trap NOx (lambda 1.3 with NOx added to give 500 ppm to the catalyst), and 1 min. rich operation to reduce the trapped NOx (lambda 0.9 with no added NOx). Typically the catalyst approached saturation with NOx at the end of the 4 min. lean period so NOx conversion were measured during the first 1 min. of the lean period to give data more representative of a commercial vehicle. The catalyst oven provided a constant catalyst temperature. SO2 gas could be added to the combustor to simulate exhaust from a 30 ppm sulfur fuel.

Figure 2:
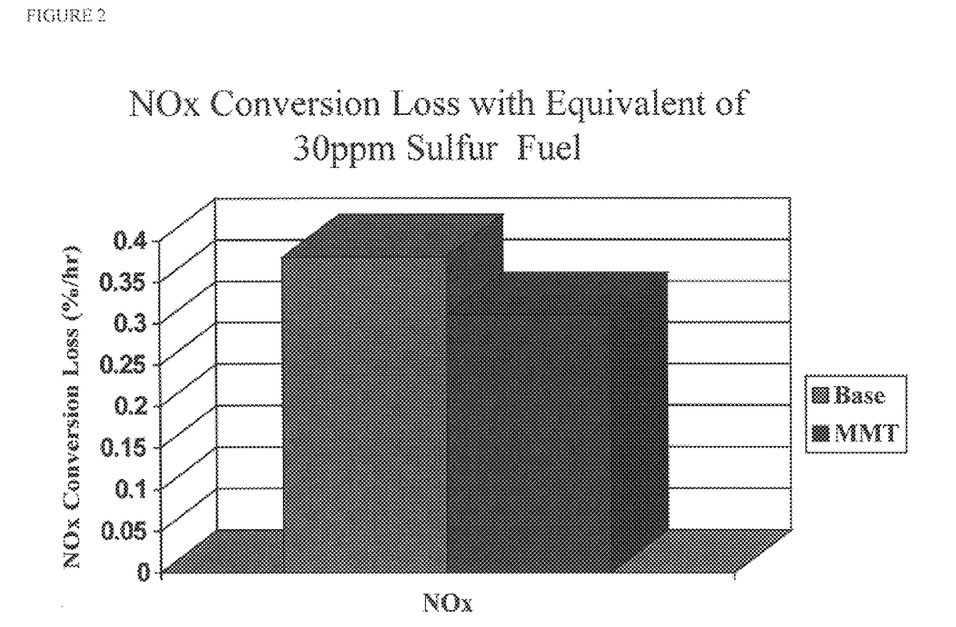
FIG. 2 is a graphical representation comparing $NO_x$ conversion loss of a lean NOx trap with a spark-ignition base fuel and the base fuel plus an organometallic compound according to the present invention, wherein the base fuel contains 30 ppm sulfur.
Figure 3:
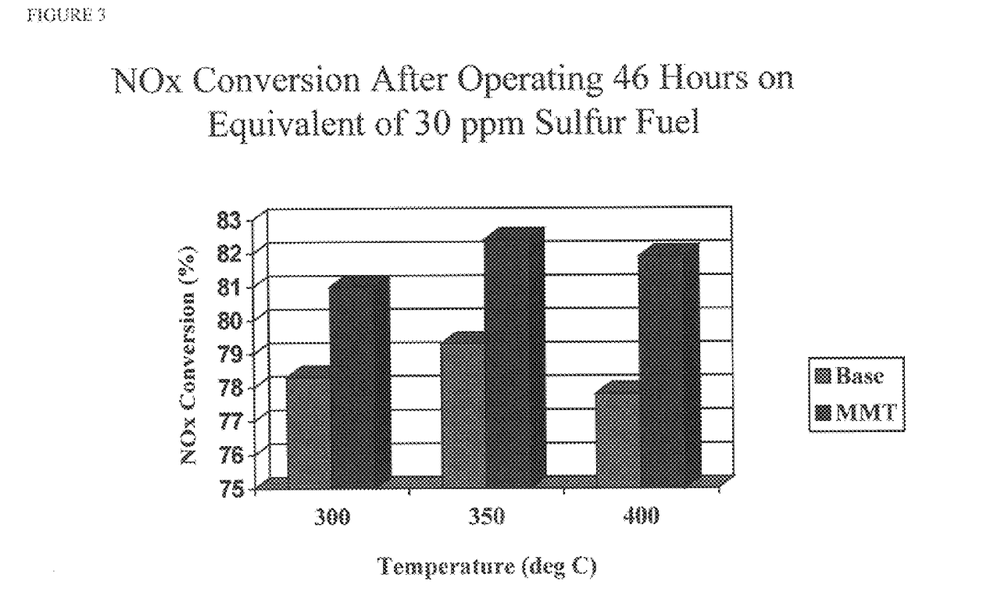
FIG. 3 is a graphical representation comparing $NO_x$ conversion of a lean NOx trap after operating 46 hours on a base fuel and a fuel composition according to the present invention.

Turning now to FIGS. 2 and 3, experimental data from a lean $NO_x$ trap evidences the beneficial properties of the present invention. The experimental protocol was as follows: exhaust gas from a 30 ppm sulfur equivalent fuel was run over the lean $NO_x$ catalysts for 46 hours with the catalyst temperature 350C. The $NO_x$ conversion was measured constantly throughout the test. The MMT fuel contained MMT at 18 mg Mn/liter. Reported conversion was calculated for the first 1 minute at lean operation. The loss in $NO_x$ conversion on an hourly basis is substantially higher for non-MMT containing fuels.

FIG. 2 illustrates the deterioration rate for $NO_x$ conversion. Conversely, this could be looked upon as the rate of sulfur poisoning of the conversion process. As can be seen from this data, MMT at 18 mg Mn/liter protected the catalyst from sulfur poisoning and resulted in a deterioration rate that was only 80% of that observed from base fuel without MMT.

FIG. 3 illustrates the lean $NO_x$ Trap $NO_x$ efficiency at the end of test for several temperatures. The LNT operated on a fuel containing MMT displayed higher activity across a range of temperatures.

Figure 4:
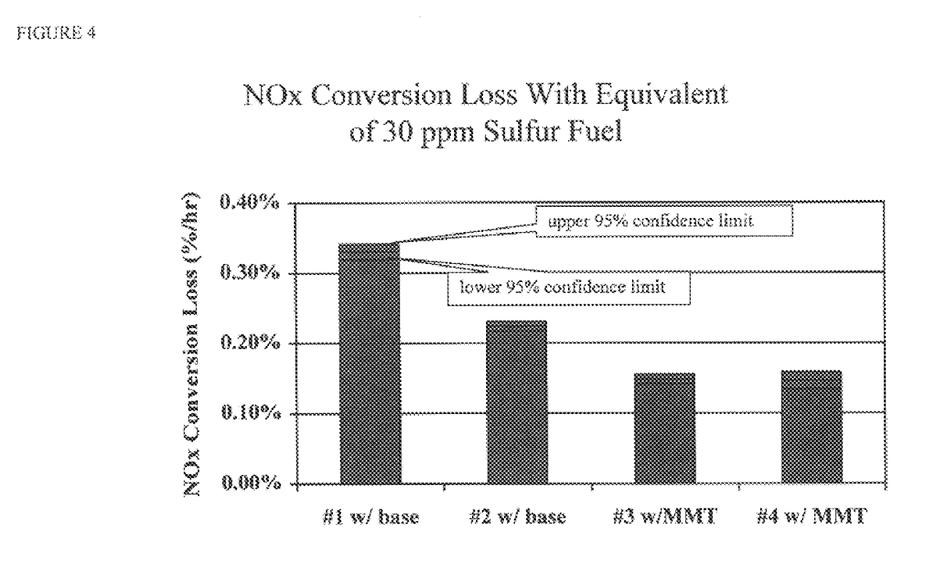
FIG. 4 is a graphical representation comparing $NO_x$ conversion loss of a catalysts with a spark-ignition base fuel and the base fuel plus an organometallic compound according to the present invention, wherein the base fuel contains 30 ppm sulfur.

FIG. 4 illustrates the deterioration rate for NOx conversion with four separate catalyst samples from the same catalyst. Samples #1 and #2 utilized base fuel and samples #3 and #4 utilized a fuel containing MMT. Both samples with MMT showed lower deterioration rates. Since the differences in deterioration rates are much greater than the 95% confidence limits, these differences are considered statistically significant.

The present invention is suitable for use in all combustion systems including burners and large and small engines, such as 4 stroke and 2 stroke engines, e.g. those in generators, leaf blowers, trimmers, snow blowers, marine engines, or other types of engines which may have the scavenger delivered to the combustion chamber. The scavenger is effective in the effluent stream of an exhaust system, especially where the emissions control is downstream from the combustion system.

Embodiments of the present invention include a method of enhancing performance durability of a catalytically-based emissions control system in a lean fuel combustion system containing a catalytic device having a transition metal, alkali or alkaline earth metal element, or combinations thereof (catalytic elements), said combustion system producing at least one byproduct, comprising supplying a fuel to said lean fuel combustion system, said combustion system being provided with a scavenger, said scavenger complexing with at least one combustion byproduct, said scavenger being supplied in an effective amount to complex with the at least one fuel combustion byproduct, whereby the impact of said fuel combustion byproduct on said emissions control system is reduced.

The present invention is also directed to an apparatus for reducing emissions control system poisoning in a lean fuel combustion system having a stream of effluent, comprising a combustion system which operates at a lambda>1.2, an emissions control system, a base fuel, and present, in an effective amount to complex with at least one combustion byproduct in the effluent stream, a scavenger.

Another embodiment of the present invention comprises an emissions system for the after treatment of a combustion process exhaust stream, comprising an exhaust passageway for the passage of an exhaust stream containing lean combustion exhaust byproducts, an exhaust treatment system comprising at least one catalytic material having catalytic activity or trapping device, said exhaust treatment system being located within the exhaust passageway and contacting the exhaust stream, wherein the exhaust stream contains a scavenger which complexes with at least one of the exhaust byproducts and reduces the impact of the byproduct upon the exhaust treatment system.

The present invention is further directed to a method of operating a lean fuel combustion system containing an catalytic exhaust treatment device comprising operating said combustion system at a lambda>1.2 and using as the fuel for said combustion system a fuel containing a scavenger in an amount sufficient to complex with at least one of the exhaust byproducts and reduce the impact of said byproduct on said catalytic exhaust treatment device.

The present invention is further dirtected to a method of operating a diesel engine having an exhaust treatment device comprising operating said engine at a lambda>1.2 and using as the fuel for said engine a compression-ignition fuel containing a scavenger in an amount sufficient to complex with at least one of the exhaust byproducts and reduce the impact of said byproduct on the exhaust treatment device.

The present invention is further dirtected to a method of operating a heterogeneously charged direct injection gasoline engine having an exhaust treatment device comprising operating said engine at a lambda>1.2 and using as the fuel for said engine a spark-ignition fuel containing a scavenger in an amount sufficient to complex with at least one of the exhaust byproducts and reduce the impact of said byproduct on the exhaust treatment device.

Emissions control devices suitable for use in the present invention include oxidation catalysts, three-way catalysts, catalyzed particulate traps, continuous regeneration traps, exhaust gas sensors and lean NOx traps.

It is to be understood that the reactants and components referred to by chemical name anywhere in the specification or claims hereof, whether referred to in the singular or plural, are identified as they exist prior to coming into contact with another substance referred to by chemical name or chemical type (e.g., base fuel, solvent, etc.). It matters not what chemical changes, transformations and/or reactions, if any, take place in the resulting mixture or solution or reaction medium as such changes, transformations and/or reactions are the natural result of bringing the specified reactants and/or components together under the conditions called for pursuant to this disclosure. Thus the reactants and components are identified as ingredients to be brought together either in performing a desired chemical reaction (such as formation of the organometallic compound) or in forming a desired composition (such as an additive concentrate or additized fuel blend). It will also be recognized that the additive components can be added or blended into or with the base fuels individually per se and/or as components used in forming preformed additive combinations and/or sub-combinations. Accordingly, even though the claims hereinafter may refer to substances, components and/or ingredients in the present tense ("comprises", "is", etc.), the reference is to the substance, components or ingredient as it existed at the time just before it was first blended or mixed with one or more other substances, components and/or ingredients in accordance with the present disclosure. The fact that the substance, components or ingredient may have lost its original identity through a chemical reaction or transformation during the course of such blending or mixing operations is thus wholly immaterial for an accurate understanding and appreciation of this disclosure and the claims thereof.

At numerous places throughout this specification, reference has been made to a number of U.S. Patents and published foreign patent applications. All such cited documents are expressly incorporated in full into this disclosure as if fully set forth herein.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

Patentee does not intend to dedicate any disclosed embodiments to the public, and to the extent any disclosed modifications or alterations may not literally fall within the scope of the claims, they are considered to be part of the invention under the doctrine of equivalents.

Having described the invention as above, we claim:

1. A method of enhancing performance durability of a catalytically-based emissions control system in a lean fuel combustion system containing a catalytic device having a transition metal, alkali or alkaline earth metal element, or combinations thereof (catalytic elements), said combustion system producing combustion byproducts of sulfur and phosphorus, comprising:

supplying a fuel to said lean fuel system, said combustion system being provided with a scavenger, said scavenger comprising an organometallic compound comprising at least one metal selected from the group consisting of magnesium, manganese, barium, cerium, strontium, iron, calcium, and mixtures thereof, said scavenger complexing with combustion byproducts of sulfur and phosphorus, said scavenger being supplied in an effective amount to complex with the fuel combustion byproducts, said scavenger being free of a platinum group metal selected from the group consisting of platinum, palladium, rhodium, ruthenium, osmium, and iridium, whereby the impact of said fuel combustion byproducts on the catalytic device of said emissions control system is reduced.

2. A method as claimed in claim 1, wherein said organometallic compound comprises at least one alkali and/or alkaline earth metal.

3. A method as claimed in claim 1, wherein said organometallic compound comprises a manganese tricarbonyl compound.

4. A method as claimed in claim 3, wherein said manganese tricarbonyl compound comprises at least one member selected from the group consisting of cyclopentadienyl manganese tricarbonyl, methylcyclopentadienyl manganese tricarbonyl and mixtures thereof.

5. A method as claimed in claim 1, wherein the scavenger is present in an amount so as to provide from 0.5 to about 120 mg of metal per liter of fuel to the combustion system.

6. A method as claimed in claim 5, wherein the scavenger is present in an amount so as to provide from about 1 to about 66 mg of metal per liter of fuel to the combustion system.

7. A method as claimed in claim 1, wherein the combustion system operates at a lambda>1.2.

8. A method as claimed in claim 7, wherein the combustion system operates at a lambda>1.4.

9. A method as claimed in claim 8, wherein the combustion system operates at a lambda>1.5.

10. A method as claimed in claim 1, wherein the emissions control system comprises a catalytic convertor.

11. A method as claimed in claim 1, wherein the emissions control system comprises a lean $NO_x$ trap.

12. A method as claimed in claim 1, wherein the emissions control system comprises a continuous regeneration trap.

13. A method as claimed in claim 1, wherein the emissions control system comprises a trap for reduction of particulate which relies at least in part on catalytic activity to reduce particulate loading in the trap.

14. A method as claimed in claim 1, wherein the catalytic device includes barium.

15. A method as claimed in claim 1, wherein the byproduct is contained in an exhaust stream having a temperature up to about 650° C.

16. A method as claimed in claim 15, wherein the exhaust stream is at a temperature in the range of from about 200 up to about 650° C.

17. A method as claimed in claim 1, wherein said fuel contains less than 100 ppm sulfur.

18. A method as claimed in claim 1, wherein said fuel is a spark-ignition fuel.

19. A method as claimed in claim 1, wherein said spark-ignition fuel comprises gasoline.

20. A method as claimed in claim 1, wherein said fuel is a compression-ignition fuel.

21. A method as claimed in claim 20, wherein said compression-ignition fuel comprises a petroleum-based middle distillate fuel having a sulfur content of 0.01 wt. % or less.

22. A method as claimed in claim 1, wherein the combustion byproduct comprises sulfur.

* * * * *